R. R. & J. RAWLE.
APPARATUS FOR AERIAL NAVIGATION.
APPLICATION FILED JUNE 24, 1909.
1,025,306.
Patented May 7, 1912.
6 SHEETS—SHEET 6.
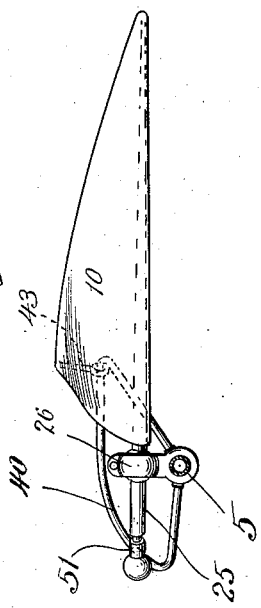
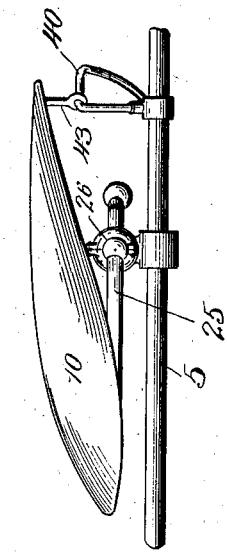
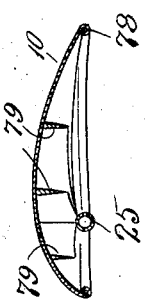
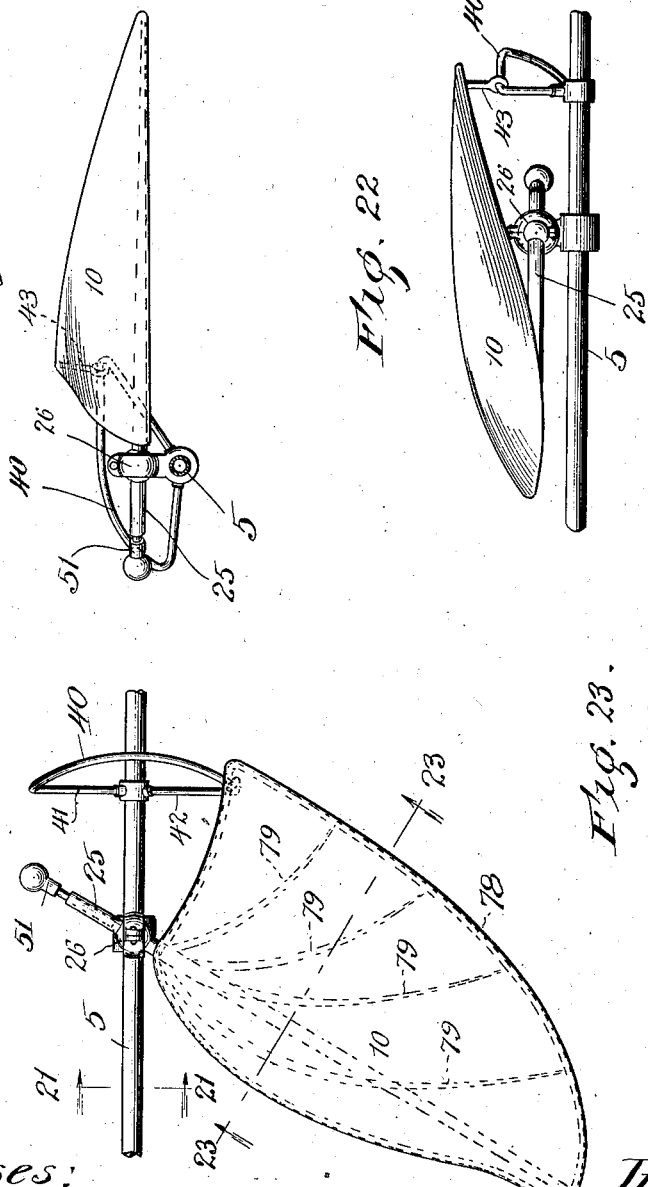
Witnesses:
Inventors:
Randolph R. Rawle
John Rawle
by Poole & Brown
Attys

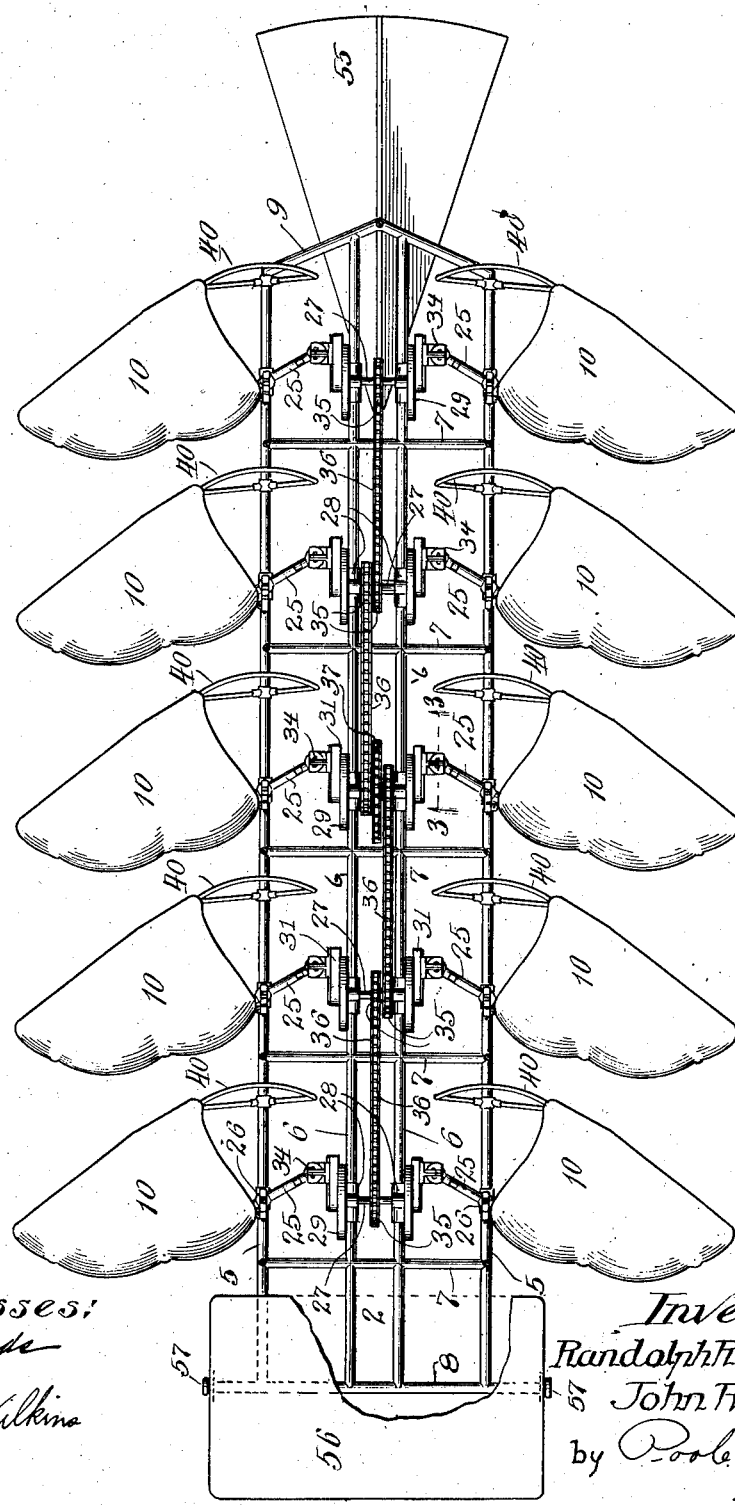

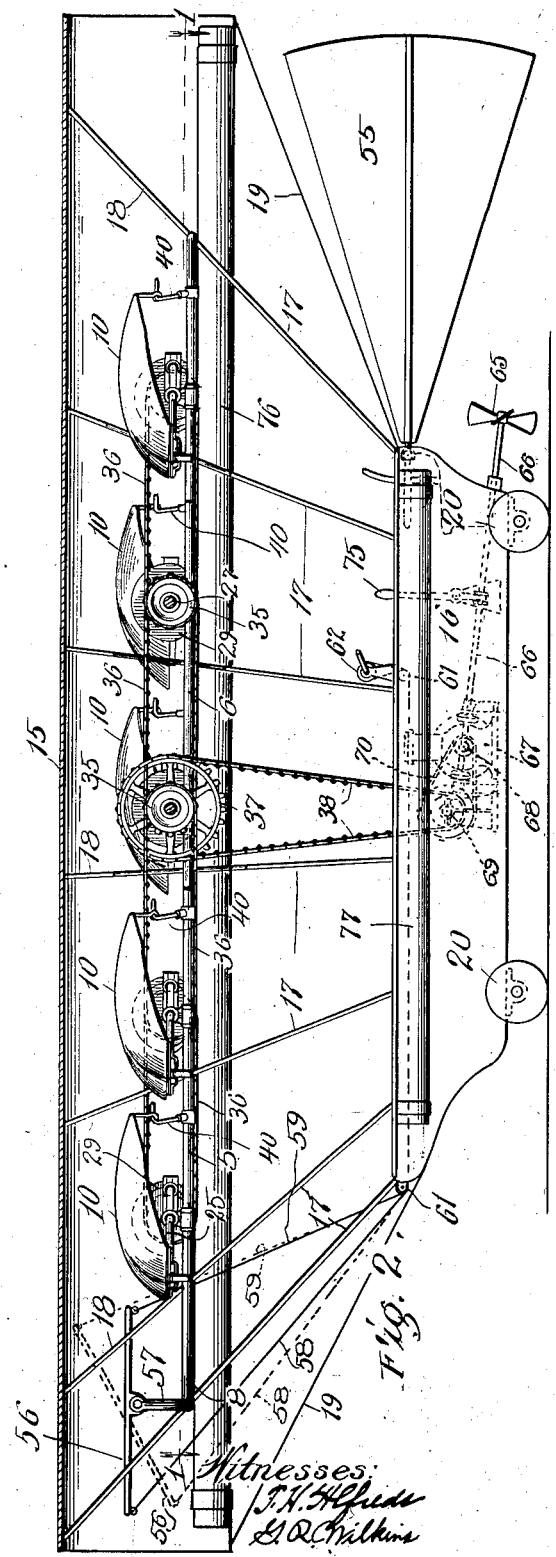

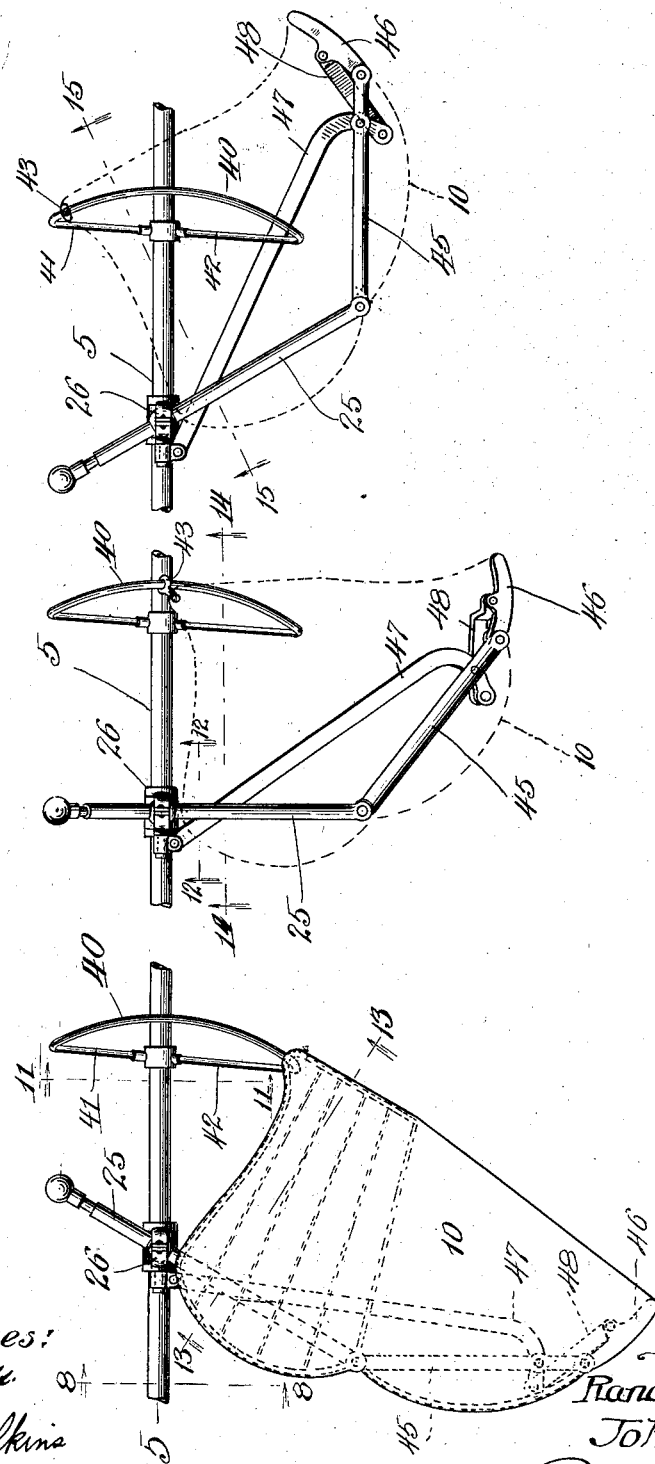

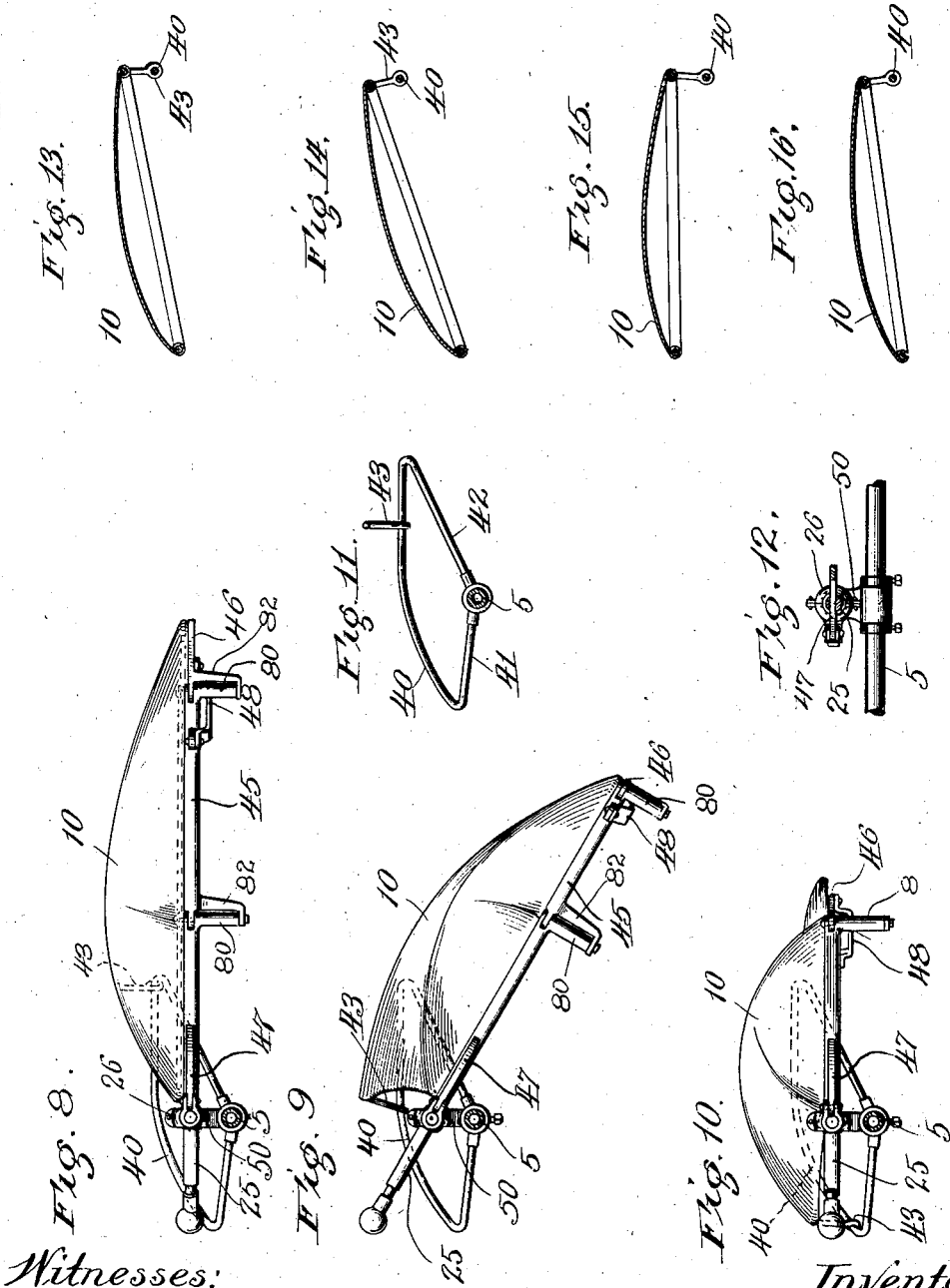

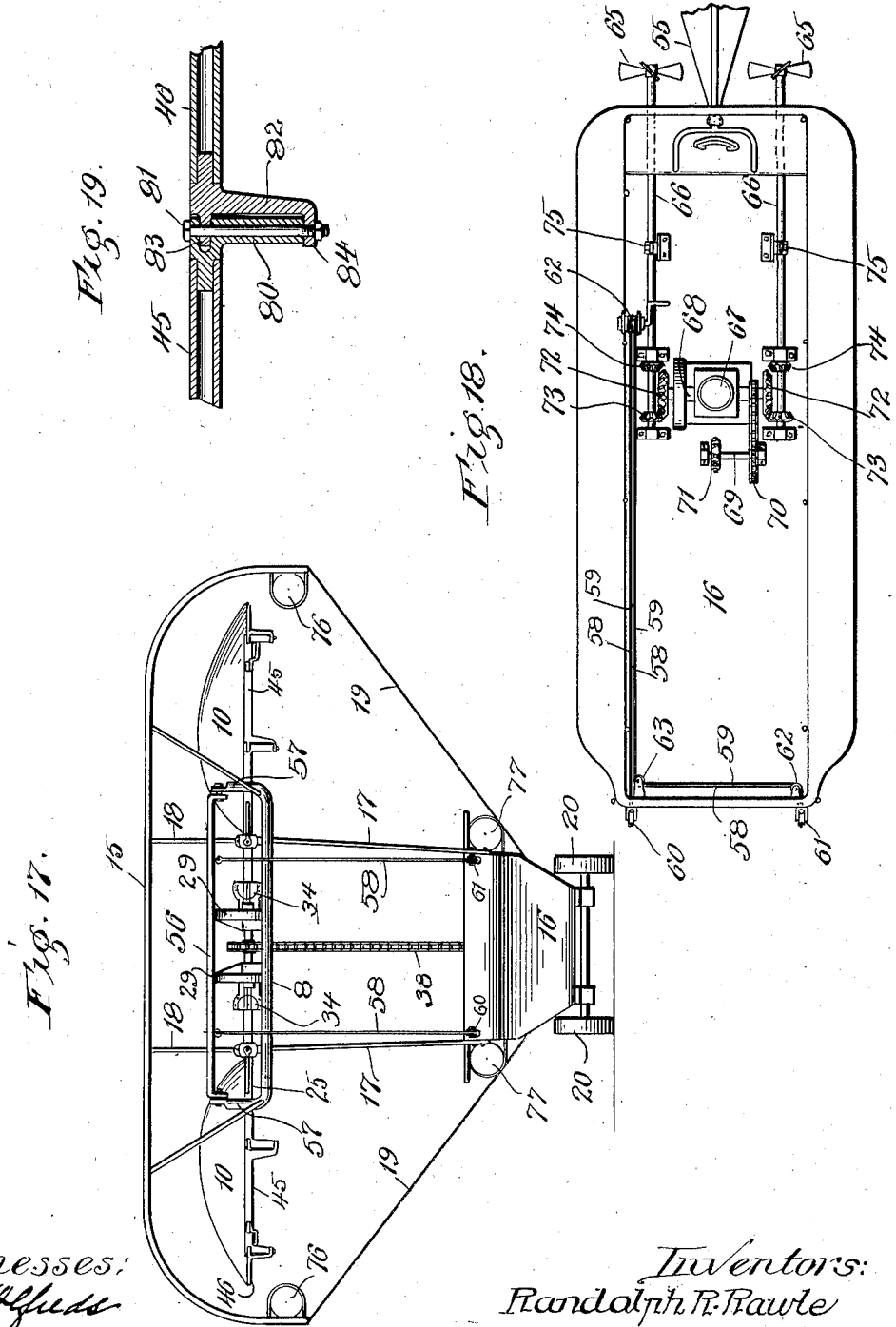
R. R. & J. RAWLE.
APPARATUS FOR AERIAL NAVIGATION.
APPLICATION FILED JUNE 24, 1909.
1,025,306.
Patented May 7, 1912.
6 SHEETS—SHEET 5.

UNITED STATES PATENT OFFICE.

RANDOLPH R. RAWLE AND JOHN RAWLE, OF CHICAGO, ILLINOIS.

APPARATUS FOR AERIAL NAVIGATION.

1,025,306.	Specification of Letters Patent.	Patented May 7, 1912.

Application filed June 24, 1909. Serial No. 503,985.

*To all whom it may concern:*

Be it known that we, RANDOLPH R. RAWLE and JOHN RAWLE, citizens of the United States, and residents of Chicago, in the county of Cook and State of Illinois, have invented certain new and useful Improvements in Apparatus for Aerial Navigation; and we do hereby declare that the following is a full, clear, and exact description thereof, reference being had to the accompanying drawings, and to the letters of reference marked thereon, which form a part of this specification.

This invention relates to an apparatus for aerial navigation of that class embracing a plurality of wing members which have both rising and falling and backward and forward movement in a manner to both lift the apparatus and propel the same forwardly.

The invention consists in the matters hereinafter described and pointed out in the appended claims.

The invention may be more readily understood by reference to the accompanying drawings, in which—

Figure 1 is a plan view of the main frame of the machine, the wing members mounted thereon and means on the frame for actuating said wing members. Fig. 2 is a view in side elevation of the apparatus illustrating the main frame and wing members shown in Fig. 1, together with an aeroplane member located above the same, and a car equipped with a motor suspended below the same. Fig. 3 is a detail section taken upon line 3—3 of Fig. 1, illustrating the device for giving rising and falling and backward and forward movement to one of the wing members. Fig. 4 is a vertical section taken on line 4—4 of Fig. 3. Fig. 5 is a detail plan view of one of the wing members and associated parts, showing the same at the forward limit of its stroke and in extended position. Fig. 6 is a like plan view of one of the wing members showing the same at the center of its backward stroke and in a partially folded condition. Fig. 7 is a like plan view of one of the wing members showing the same at the rearward limit of its backward and forward stroke and in its retracted condition. Fig. 8 is a view in elevation, as seen from its front margin, of a wing member and its associated parts, taken upon section line 8—8 of Fig. 5. Fig. 9 is a view similar to Fig. 8 showing the wing member in its depressed position and partially contracted. Fig. 10 is a view like Figs. 8 and 9 showing the wing member in the rearward limit of its backward stroke and in its contracted position. Fig. 11 is a detail section taken upon line 11—11 of Fig. 5, showing the guide rods for the rear margin of the wing member. Fig. 12 is a detail section taken upon line 12—12 of Fig. 6. Fig. 13 is a detail section, taken on line 13—13 of Fig. 5, showing the inclination of the same at the forward limit of its stroke. Fig. 14 is a detail section of the wing member taken upon line 14—14 of Fig. 6, showing the inclination of the same at the intermediate point of its backward stroke. Fig. 15 is a detail section of the wing member taken upon line 15—15 of Fig. 7, showing the position of the same at the rearward limit of its stroke. Fig. 16 is a detail section showing the position of the wing member when at the central part of its forward stroke. Fig. 17 is an end view of the apparatus as seen from the front. Fig. 18 is a plan view of the suspended car of the apparatus. Fig. 19 is a detail, sectional view of the joint between two of the frame bars of the wing member illustrated in Figs. 8, 9 and 10. Fig. 20 is a plan view of a form of wing member having a rigid frame, together with a part of the frame member which supports the same, and parts thereon. Fig. 21 is a sectional view taken on line 21—21 of Fig. 20, showing the frame member and parts thereon, and illustrating the wing member in side elevation. Fig. 22 is a view in elevation of the frame member and parts thereon shown in Figs. 20 and 21, showing the wing member in end view. Fig. 23 is a sectional view taken on line 23—23 of Fig. 20.

As shown in said drawings, the main frame of the apparatus embraces two lateral, longitudinal frame-members 5, 5, two intermediate, longitudinal frame-members 6, 6 arranged parallel with each other and with the lateral frame members 5, 5, transverse frame-members 7, 7, 7, a forward frame member 8, joining the forward ends of the lateral frame-members 5, 5 and a rear frame-member 9 joining the rear end of said lateral frame members 5, 5. Said frame members are shown as made of metal tubes which are rigidly attached to each other at their points of intersection.

10, 10, 10 indicate wing members, a plurality of which are located on each side of the machine in the same horizontal plane and which are connected with the lateral longitudinal frame members 5, 5 by means of universal joints. Said wing members are given rising and falling and also backward and forward oscillatory movement by means of actuating devices constructed as hereinafter described.

As shown in Figs. 2 and 17 of the drawings, a horizontal, longitudinally extending aeroplane member 15 is located above and parallel with the main frame, and a car 16 is supported centrally below the said main frame. Said car is suspended from the main frame by means of rods 17, 17, 17 rising from the car in radial relation to each other, and connected with the marginal frame members of the main frame. Other rods 18, 18, preferably arranged in line with the rods 17, 17, 17, extend upwardly from the main frame to the margins of the aeroplane member 15, and serve to rigidly connect said member with the main frame. As clearly seen in Fig. 17, said aeroplane member 15 is extended laterally outside of the wing members 10, 10 and the side margins are deflected downwardly and terminate below the level of the wing members. The lower edges of said aeroplane members are connected with the car 16 by oblique wires or cables 19, 19. The depending, lateral portions of the aeroplane member, arranged as described, serve to confine the air from escaping at the sides of the aeroplane member, so that the latter will act in the nature of a parachute in the descent of the apparatus. The car shown is provided with supporting wheels 20, 20 by which the apparatus will be supported when it rests upon the ground. Each wing member 10 consists of a light frame, to which is secured a covering of thin flexible material, such as cloth, canvas, rubber or sheet metal. The wing member is attached to the outer end of the supporting shaft 25, which is connected by means of a ball and socket joint 26 with the lateral frame member 5. Said ball and socket joint is shown as formed upon the upper end of an arm 50 which is rigidly attached to and rises from the said frame member 5. The wing member is attached, at its forward margin, to the outer part or end of the supporting shaft 25, exterior to the ball and socket joint 26, and the outwardly extending end portion of the said supporting shaft constitutes one of the principal members of the frame of the wing member. Said ball and socket joint affords a universal joint between the said supporting shaft and the main frame, permitting both rising and falling and backward and forward oscillatory movement in the wing member, and also tilting movement in the wing member, by which the rear margin thereof may be given rising and falling movement relatively to the forward margin of the same. The wing members are located in pairs at opposite sides of the main frame, and each pair of wing members is actuated by means of a horizontal, rotative shaft 27 mounted transversely on the machine frame, in bearings 28, 28 which are attached to the inner longitudinal members 6, 6 of said frame.

As clearly seen in Figs. 3 and 4, the bearing 28 for each end of the shaft 27 is rigidly secured to the frame member 6 and has thereon a vertically arranged cam-plate 29 provided with a cam groove 30 which extends around the shaft 27. To the end of the shaft 27, outside of the cam-plate 29, is secured a crank arm 31. Said crank arm is provided with longitudinal guides on which is mounted a sliding head 32. The crank arm 31 is longitudinally slotted and the sliding head is provided with an arm 33 which extends through the slot in the crank arm and engages the groove 30 in the cam-plate 29. The sliding head 32 is connected by a ball and socket joint 34 with the inner end of a sliding or telescopic section 51 on the inner end of the supporting shaft 25; the socket member of the said joint being carried by the said head and the ball member being formed upon the inner end of said telescopic section 51. The inner end of the said supporting shaft 25 is made hollow or tubular, and the section 51 is arranged to slide therein. By reason of the sliding or telescopic joint between the said supporting shaft 25 and the inner section 51 thereof, the latter is adapted to follow a path corresponding with the shape of the cam groove 30, parts of which are located at different distances from the ball and socket joint 34. When the shaft 27 is rotated the crank-arm 31 will give rotative movement to the head 32, and the inner end of the arm 33 on the head will thereby be moved along the cam-grooves 30 as the head 32 is carried around the axis of the shaft 27, thereby giving rising and falling and also backward and forward movement to the wing member, which is carried upon the outer end of said supporting shaft 25. The engagement of the stud 33 with the cam-groove 30 produces a radial movement of the head 32 on the crank-arm, so that the inner end of the supporting shaft 25 and the outer end of the wing member will move in a path corresponding with the shape of the said cam groove. Said cam groove may be given any desired shape in accordance with the particular kind of motion it is desired to give to the outer end of the wing member.

In the construction illustrated the upper part of the cam groove is substantially concentric with the shaft 27 while its lower part is much nearer the axis of said shaft than its upper part and is nearly straight. Inasmuch as the wing member is elevated when the inner end of the shaft 25 is opposite the lower part of said cam groove, and is depressed when the inner end of said shaft is opposite the upper part of the cam groove, the path of movement of the wing when elevated will be determined by the shape of the lower part of the cam-groove, and vice versa. In other words, the direction of movement of the wing member in any part of its loop-shaped path will be determined by the shape of the corresponding opposite portion of the cam groove. In the construction illustrated, therefore, the wing when elevated and moving forwardly will have a nearly horizontal movement because of the flattened form of the lower part of the cam groove and when said wing member is depressed and is moving backwardly it will move in approximately semi-circular path. It follows that, in the forward stroke of the wing member the latter will have only a small amount of vertical movement and will act in the nature of an aeroplane member to support the apparatus and during the down-stroke of the wing member will move downwardly and rearwardly in a manner adapted to lift the apparatus and impel the same in a forward direction. The wing member is made concave on its lower surface and convex on its upper surface, so that it will act with greater effect upon the air when moving downwardly than when moving upwardly.

The driving device illustrated for actuating the several shafts 27, 27, 27, consists of pulleys 35, 35, 35 affixed to said shafts, there being two of said pulleys on each shaft excepting those at the forward and rear ends of the main frame, and driving belts 36, 36 trained over said pulleys. The apparatus illustrated is provided with five pairs of wings and five driving shafts therefor, and in this case power for driving the several shafts is applied to the central one of the five. The driving means illustrated consist of a motor 67 mounted on the car, as shown in Fig. 18 and in dotted lines in Fig. 2, a driving pulley 37 affixed to the central shaft 27, and a chain belt 38 by means of which motion is transmitted from the motor to said pulley 37. The several pulleys 35, 35 and 37, are shown as having the form of sprocket wheels and the driving belts 36 as consisting of chain belts.

Devices are provided for giving rising and falling movement to the rear margins of the wing-member relatively to the forward margin thereof as follows: As hereinbefore stated, the wing member is attached to its supporting shaft 25 adjacent to the forward margin of said wing member, and as said supporting shaft is adapted to turn or gyrate on its own axis in the ball and socket joint connecting it with the main frame, the rear margin of the wing member is adapted to swing or oscillate up and down about the axis of the said supporting shaft. For imparting rising and falling movement to the rear margins of the wing member a guide rod 40 is secured transversely to the longitudinal, lateral frame member 5 at the rear of the ball and socket joint 26. Said guide-rod 40 is curved concentrically with said ball and socket joint and is made of arched form, with its inner end lower than its outer end. As preferably constructed, the guide-rod 40 extends transversely over the frame member 5 and is connected with the same by means of two supporting arms 41, 42 (Fig. 11). Attached to the rear margin of the wing-member frame, at the inner end of said margin, is a guide loop 43 which engages and is adapted to slide upon the guide-rod 40. During the backward and forward oscillatory movement of the wing-member said guide loop 43 by its engagement with said guide-rod 40 will give a rising and falling movement to the rear margin of said wing-member, the parts being so arranged in the construction illustrated that when the wing-member is at the rearward limit of its movement, and the guide loop 43 is engaged with the lower inner end of the guide-rod, said rear margin of the ring member will be depressed and when said wing-member is at the forward limit of its oscillatory movement and the guide loop 43 is engaged with the elevated outer end of said guide rod, said rear margin of the wing-member will be elevated. These parts are so arranged moreover, that when the wing-member is at the forward limit of its movement, as seen in Figs. 5, 8 and 13, the wing will have an intermediate rearward and upward inclination from its forward edge, when the wing-member is in the intermediate part of its backward stroke, as seen in Figs. 6, 9 and 14, the wing-member will have a maximum upward and rearward inclination from its forward edge, when said wing-member is at the rearward limit of its movement, the wing-member will be substantially horizontal, as seen in Figs. 7, 10 and 15, and when the wing member is in the intermediate part of its forward stroke, as seen in said Fig. 6 and in Fig. 16, it will be only slightly inclined upwardly from its forward edge. As a result of this construction and arrangement said wing member, during its downward and rearward stroke, will stand in a rearwardly and upwardly inclined position, and will therefore be in position best adapted to act on the air in a manner to give forward movement to the apparatus. When elevated and during its forward stroke, however, the wing member will be substantially horizontal so that it will then afford substantially no resistance to the forward movement of the apparatus and act as an aeroplane member to aid in supporting the apparatus.

The wing-member illustrated in Figs. 1 to 10 is made extensible and contractible and means are provided for extending or spreading the same during its forward movement and contracting or folding it during its rearward stroke, so that said wing member will be in extended position when making its downward or lifting stroke and in its contracted condition when making its upward stroke, the devices for this purpose being constructed as follows: The frame of the wing member embraces jointed or flexibly connected frame bars, the innermost one of which is formed by the outer part of the supporting shaft 25 and the outer ones of which consist of an intermediate frame-bar 45 pivoted to the outer end of the shaft 25, and a terminal frame bar 46, pivoted to the outer end of the frame bar 45. The pivotal connections between said frame bars are so constructed that the same will be flexed upon each other in the plane of the wing-member, in such manner that the two outermost frame bars may be flexed or swung or folded rearwardly with the effect of contracting the wing-member, the cloth covering of which is adapted to be stretched tightly when the wing-member is extended, as shown in Fig. 5, and to be loosely folded when the wing-member is partially or fully contracted as shown in Figs. 6 and 7. Preferably, the inner portion of the wing-member, which is attached to and directly supported by the outer part of the shaft 25 is provided with a rigid frame over which the inner portion of the cloth covering is stretched, as clearly seen in dotted lines in Fig. 5. For the purpose of flexing the intermediate frame member 45 relatively to the supporting shaft 25, an actuating bar 47 is pivoted to the machine frame at a point horizontally distant from and at the rear of the ball and socket joint 26, and at its outer end is pivoted to the said frame member 45, near the outer end of the same. As illustrated, the said bar 47 is located in the same plane with, and passes through a longitudinal slot in, the said shaft 25. The actuating bar 47 thus arranged serves to extend the intermediate frame bar 45 or swing the same outwardly more nearly into alinement with the shaft 25, when the wing member is swung to its forward position as shown in Fig. 5. In the back stroke of the wing-member, however, said bar 47 flexes the frame member 45 rearwardly as seen in Figs. 6 and 7. For giving like flexing movement to the terminal frame-member 46 on the intermediate frame-member 45, the bar 47 is extended at its outer end outwardly from the pivot connecting the same with the frame bar 45, and to the extremity of said bar 47 is pivotally connected one end of a link 48, the opposite end of which link is connected with an inwardly projecting lug on the said terminal frame-member 46. Said outer end of the frame bar 47 extends in a direction substantially transverse to the frame-member 45, so that when the said bar 47 is swung or turned on its pivot connecting it with said bar, as the latter swings rearwardly, the link 48 will flex the terminal frame-member 46 rearwardly as seen in Figs. 6 and 7.

It follows from the construction described that when the wing member is at the forward or advance limit of its stroke the frame-members 45 and 46 will be fully extended and when said wing member is in the rearward limit of its movement said frame-members will be flexed to a maximum extent relatively to each other and the wing members will be fully contracted. Inasmuch as the wing member will be in an expanded condition when advanced and making its downward stroke, it will be seen that at this time it will present its broadest expanse for action against the air, and that when said wing member is at the rearward limit of its stroke and is rising it will be contracted and will present a minimum area or surface for contact with the air.

In order that the frame bars 45 and 46 of the wing member may be held rigidly in the same plane with each other and the shaft 25, notwithstanding the upward pressure of the air on the outer end of the wing member, a special construction is provided on the joints between said frame bars, as clearly shown in Fig. 19. As illustrated in said Fig. 19, the frame bar 45 has at its outer end an upright rigidly attached hollow or tubular hinge member 80 through which passes an upright pivot bolt 81, and the frame bar 46 has at its inner end a rigidly attached upright arm 82, provided with upper and lower lugs 83 and 84 which are engaged by the upper and lower ends of said pivot bolt. The hinged connection between the outer end of the shaft 25 and the intermediate frame bar 45 will be similarly constructed, as seen in Figs. 8, 9 and 10.

A rudder 55 is mounted on the rear end of the car 16 for steering the apparatus. As illustrated, said rudder is provided with both vertical and horizontal wings and is made of tapered form, being wider at its rear than at its forward end. Said rudder is connected by a universal joint with the rear end of the car, so that it may be raised or lowered or moved laterally for giving either the rising or falling or lateral movement to the apparatus.

At the forward end of the apparatus, beneath the aeroplane member 15, is located a horizontal rudder 56 adapted to give rising and falling movement to the said forward end of the apparatus. To afford support for said horizontal rudder the front, transverse frame member 8 is extended at its ends outside of the main, longitudinal frame members 5, 5 and is extended upwardly to form two supporting standards 57, 57 (Fig. 17). The said rudder 56 consists of a flat rectangular frame over which flexible material is stretched and secured. The said rudder is pivoted at its ends to the upper ends of the standards 57, 57 so that it will swing on an axis midway between its forward and rear edges. For moving or shifting the rudder 56 and holding the same in position, cables 58 and 59 are attached to the forward and rear margin of the rudder and are led downwardly to guide pulleys 60 and 61 on the forward end of the car, and thence over other guide pulleys to a hand-operated windlass 62, around which they are wound in opposite directions, so that, by the turning of said windlass, the forward and rear edges of said rudder may be correspondingly raised or lowered.

Mounted on the car 16 at the rear end thereof are two propellers 65, 65 arranged at opposite sides of the center line of the apparatus and in the same horizontal plane. Said propellers serve to aid in the propulsion of the apparatus but are designed mainly as an aid in steering. Said propellers are mounted on the rear ends of the longitudinally arranged nearly horizontal shafts 66, 66 which are mounted in suitable bearings on the car, and are adapted to slide endwise in said bearings. The motor 67, by which the wings are given movement, as hereinbefore described, is provided with a horizontal driving shaft 68 extending transversely of the car. A countershaft 69, located forward of the motor, is driven from the shaft 68 by a chain-belt 70 and is provided with a sprocket wheel 71 over which the driving belt 38 is trained. On the ends of the shaft 68 are secured bevel gear wheels 72, 72. The forward ends of the propeller shafts 66, 66 are arranged transversely of the ends of said shaft 68 outside of and parallel with the bevel gear wheels 72, 72. On each of said propeller shafts are secured two bevel gear-pinions 73, 74 arranged on the said propeller shaft at a distance apart somewhat greater than the diameter of said gear wheel 72. One or the other of said gear-pinions 73 and 74 may be brought into intermeshing engagement with the gear wheel 72 by giving endwise movement to the propeller shaft. Two operating levers 75, 75 are mounted on the car and are engaged with the propeller shafts in a manner to give endwise movement to the same. By shifting said operating levers either of the gear-pinions 73 and 74 on either shaft may be brought into engagement with one of the gear wheels 72, 72, or both gear-pinions may be disengaged from said gear wheels. It follows that by movement of said operating levers both propellers may be driven in a direction to propel the apparatus, either propeller may be driven forward or backward while the other propeller is out of use, or one propeller may be driven forward and the other backward. When both propellers are driven forwardly, or in a direction to give forward movement to the apparatus, the propellers will aid the wings in the propulsion of the apparatus, as may be necessary in navigating against high winds or in emergencies. Both propellers may be turned backward to quickly arrest the forward movement of the apparatus, as when making a landing. By turning one propeller either backward or forward, the apparatus may be turned to the right or left in steering more promptly than when the steering rudder is relied upon alone for this purpose. When the two propellers are rotated at the same time a quick turn either to the right or left may be made for emergencies. The apparatus illustrated is provided with closed, longitudinally extending tubes 76, 76 secured to the frame of the aeroplane member 15 at the side margins of the latter, and with like closed tubes 77, 77 secured to the sides of the car 16. Said tubes insure flotation of the apparatus in case the same should descend upon the water. Said tubes may be filled with air or they may constitute reservoirs to contain a supply of gas under compression when gaseous fuel is used in the motor.

In Figs. 20, 21, 22 and 23 is shown a form of construction in the wing members which may be used in place of that shown in the figures hereinbefore described. In this instance, the wing member is not expansible and contractible, but its frame consists of rigidly connected members, preferably having the form of a marginal frame member 78 and curved, radiating ribs 79, 79 secured at their inner ends to the shaft 25, near the frame member 5, and at their outer ends to the marginal frame member 78. So far as the tilting movement in the wing members by which their rear margins are given a rising and falling motion relatively to their forward margins, the wing members shown in said Figs. 20 to 23 operate in the same manner as those illustrated in the other figures of the drawings, and, if found desirable or preferable, wing members of both the kinds illustrated may be employed in the same apparatus. When such non-expansible wing members are employed in connection with the expansible wing members shown in Figs. 5, 6 and 7, the two kinds may be arranged in alternation with each other at each side of the apparatus, or in any other suitable relative position or arrangement.

It is to be understood that we have shown in the accompanying drawings one practical embodiment of an apparatus embodying our invention and that we do not desire to be limited to the specific features of construction illustrated in the said drawings, except so far as the same may be set forth in the appended claims as constituting parts of features of our invention.

We claim as our invention:—

1. In an apparatus for aerial navigation, the combination with the frame of the apparatus, of a wing member connected with the frame by means affording universal swinging movement of the wing member relatively to the frame and also rotative movement of said wing member on its longitudinal axis, and actuating means on the frame operating on the wing member to give to the latter rising and falling and backward and forward oscillatory movement, together with a simultaneous rotative or tilting movement, affording rising and falling motion of the rear, relatively to the forward, part of the said wing member at each stroke of the same.

2. In an apparatus for aerial navigation, the combination with the frame of the apparatus, of a wing-member connected with the frame by means affording universal movement of the wing-member on the frame, actuating means on the frame giving rising and falling and also backward and forward oscillatory movement to said wing-member, and a guide on the frame engaged with the rear part of the wing-member and acting to give rising and falling movement to said rear part, relatively to the forward part of the wing-member, in the oscillatory movement of the latter.

3. In an apparatus for aerial navigation, a wing member provided with a frame embracing frame bars pivotally connected with each other at their ends to permit the wing to be longitudinally expanded and contracted by the flexing of the frame bars on each other, actuating means acting on the frame as a whole to give rising and falling and forward and rearward oscillatory motion thereto, and actuating means operating through the oscillatory movement of the frame as a whole and acting on the frame bars to flex the same on each other and to thereby longitudinally expand and contract the said wing member automatically during the oscillatory movement of the same.

4. In an apparatus for aerial navigation, the combination with a main frame, of a wing-member having a frame which is connected with the main frame by a universal joint, means acting on the wing-member frame to give rising and falling and backward and forward oscillatory motion thereto, and a guide on the main frame engaging the rear part of the wing-member frame and acting in connection with the oscillatory motion of said wing-member to give rising and falling movement to the rear, relatively to the forward, margin of said wing-member.

5. In an apparatus for aerial navigation, the combination with a main frame, of a wing-member provided with a frame, an operative shaft to which said wing-member frame is attached, said operating shaft being connected with the frame by a ball and socket joint, means acting on said shaft giving rising and falling and forward and backward oscillatory movement to the wing-member, and a guide on the main frame engaging said wing-member frame at a point rearwardly of the said shaft and acting through the oscillatory movement of the wing-member to give rising and falling movement to the rear, relatively to the forward, edge of said wing-member.

6. In an apparatus for aerial navigation, the combination with a main frame, of a wing-member having a frame which is connected with said main frame by a universal joint affording turning movement in the wing in a manner permitting rising and falling movement of the rear margin relatively to the forward margin of the wing-member, means giving rising and falling and backward and forward oscillatory movement to said wing-member, and a transversely arranged guide rod on the main frame, curved concentrically with said universal joint, and having its inner end lower than its outer end, said wing-member having a guide loop at its rear portion adapted to slide on said guide-rod.

7. In an apparatus for aerial navigation, the combination with a main frame, of a wing-member provided with a frame, an actuating shaft to which said wing-member frame is attached, a universal joint connecting the said shaft with the main frame, a rotative shaft provided with a crank arm which acts on the said shaft to give rising and falling and backward and forward oscillatory movement to the wing-member, and a fixed cam on the machine frame, acting on said shaft to give to the wing-member movement in a path corresponding with the form of said cam.

8. In an apparatus for aerial navigation, the combination with a main frame, of a wing-member, an actuating shaft to which said wing-member is attached, a universal joint connecting the said shaft with the main frame, a rotative shaft provided with a crank arm, a slide on the crank arm connected with the said wing-member shaft by a universal joint, and a cam on the main frame acting on the said slide to give inward and outward movement of the same on the crank arm.

9. In an apparatus for aerial navigation, the combination with a main frame, of a wing-member connected by a universal joint with the main frame, means for giving rising and falling and backward and forward movement to the wing-member, said wing-member having a frame which includes two jointed frame-bars adapted to be flexed upon each other in the plane of the wing-member, and an actuating bar pivoted to the main frame, at a point horizontally distant from the said universal joint, and to the outermost of said jointed frame bars, said actuating bar being adapted to flex the said frame bars in the backward and forward movement of the wing-member.

10. In an apparatus for aerial navigation, the combination with a main frame, of a wing-member connected by a universal joint with said main frame, means giving rising and falling and backward and forward movement to said wing-member, said wing-member having a frame embracing three jointed frame bars, adapted to be flexed upon each other in the plane of the wing-member, an actuating bar pivoted to the main frame at a point horizontally distant from said universal joint and to the intermediate jointed frame-bar, between the ends of the latter, and a second actuating bar pivoted to the first named actuating bar and to the outermost of said jointed frame bars.

11. In an apparatus for aerial navigation, the combination with a main frame, of a wing-member, a supporting shaft for said wing-member which is connected with the main frame by a universal joint, means acting on the inner end of said supporting shaft, giving rising and falling and backward and forward movement to said wing-member, said wing-member having a frame consisting of three jointed frame bars, the innermost one of which is formed by the prolonged outer end of said supporting shaft, and which are adapted to be flexed on each other in the plane of the wing-member, and two actuating bars, one of which is pivoted to the machine frame at a point horizontally distant from said universal joint, and is also pivoted to the intermediate jointed frame bar, and the other of which is pivoted to the outer end of said first named actuating bar and to the outermost of said frame bars.

12. In an apparatus for aerial navigation, a wing-member having rising and falling and backward and forward oscillatory motion, jointed frame bars for said wing-member, and means for flexing said frame bars on each other, operated by the backward and forward oscillatory motion of the wing-member, the joints between said frame bars being formed by means of vertically elongated hinge-members rigidly attached to the adjacent ends of said frame bars and pivotally connected with each other.

13. In an apparatus for aerial navigation, the combination with a main frame having longitudinal, lateral frame members, of a plurality of wing-members severally provided with supporting shafts which are connected with the said tubular frame members by ball-and-socket joints, means on the main frame acting on the inner ends of the supporting shafts to give oscillatory rising and falling and backward and forward motion to said wing-members, and transversely extending, curved guide rods secured to said lateral frame members, and guide loops attached to the rear parts of the wing-members and having sliding engagement with said guide rods.

14. In an apparatus for aerial navigation, a horizontally extending main frame, wing-members supported on the sides of the main frame and having rising and falling and backward and forward oscillatory motion, a horizontally extending aeroplane member rigidly connected with the main frame above the level of the said wing members, a car suspended from the main frame, a horizontal rudder mounted on the main frame and adapted to turn on a horizontal transverse pivotal axis, located between its forward and rear margins, and ropes connected with said rudder at points forward and at the rear of its pivotal axis, and a windlass on the car for operating said ropes.

15. In an apparatus for aerial navigation, a horizontally extending main frame, wing members supported on the sides of the main frame and having rising and falling and backward and forward oscillatory motion, a car suspended beneath said main frame, a rudder on the rear end of the car having vertical and horizontal surfaces and adapted for both vertical and horizontal movement, and a horizontal rudder mounted on the forward end of the main frame.

16. An apparatus for aerial navigation embracing a main frame, wing members supported on the sides of the main frame and having rising and falling and backward and forward oscillatory motion, a horizontally extending aeroplane member rigidly attached to said main frame, and closed cylinders attached to the side margins of said aeroplane member.

In testimony that we claim the foregoing as our invention we affix our signatures in the presence of two witnesses, this 21st day of June A. D. 1909.

RANDOLPH R. RAWLE.
JOHN RAWLE.

Witnesses:
T. H. ALFREDS,
G. R. WILKINS.